(12) United States Patent
Isobe et al.

(10) Patent No.: US 7,865,066 B2
(45) Date of Patent: Jan. 4, 2011

(54) VIDEO CAMERA AND VIDEO CAMERA INFORMATION RECORDING METHOD FOR MANAGING A SCENE AS A CHAPTER

(75) Inventors: Yukio Isobe, Yokohama (JP); Susumu Yoshida, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 1231 days.

(21) Appl. No.: 10/269,765

(22) Filed: Oct. 11, 2002

(65) Prior Publication Data
US 2003/0152369 A1  Aug. 14, 2003

(30) Foreign Application Priority Data
Feb. 13, 2002 (JP) ............... 2002-034807
Aug. 8, 2002 (JP) ............... 2002-230751

(51) Int. Cl.
*H04N 5/00* (2006.01)
*H04N 5/91* (2006.01)
*H04N 7/00* (2006.01)

(52) U.S. Cl. ............... 386/126; 386/46; 386/95; 386/117; 386/124; 386/125; 369/47.1

(58) Field of Classification Search ............ 386/1–126; 358/310, 342, 343, 335; 360/48, 55, 72.1, 360/121; 369/47, 56, 30.04, 47.1; 371/37.4
See application file for complete search history.

(56) References Cited

U.S. PATENT DOCUMENTS

| | | | | |
|---|---|---|---|---|
| 5,559,608 | A * | 9/1996 | Kunihiro | 386/101 |
| 5,598,391 | A | 1/1997 | Mukawa | |
| 6,130,988 | A * | 10/2000 | Jeong | 386/125 |
| 6,308,005 | B1 * | 10/2001 | Ando et al. | 386/95 |
| 6,327,109 | B1 * | 12/2001 | Kori et al. | 360/72.1 |
| 6,377,518 | B1 * | 4/2002 | Auwens et al. | 369/30.04 |
| 6,408,301 | B1 * | 6/2002 | Patton et al. | 707/102 |
| 6,504,997 | B1 * | 1/2003 | Park et al. | 386/125 |
| 6,650,827 | B1 | 11/2003 | Ogikubo et al. | |

(Continued)

FOREIGN PATENT DOCUMENTS

JP  05-198141 A  8/1993

(Continued)

OTHER PUBLICATIONS

Japan Patent Office (JPO) office action for JPO patent application JP2007-026394 (Feb. 12, 2008).

*Primary Examiner*—Thai Tran
*Assistant Examiner*—Hung Q Dang
(74) *Attorney, Agent, or Firm*—Townsend and Townsend and Crew LLP

(57) ABSTRACT

Disclosed are: an information recording technology capable of shortening the termination process time when the recording ends; and an information recording technology capable of recording independently of limitations due to the maximum number of video title sets and titles, wherein information is recorded on a recording medium according to recording instructions such as a recording start instruction and a recording stop instruction. During a finalization process, management information is generated and is recorded on the recording medium. Based on this management information, the information generated by a single recording instruction is managed as one chapter. At least one chapter is managed as one title. At least one title is managed as one video title set.

7 Claims, 6 Drawing Sheets

U.S. PATENT DOCUMENTS

| | | | |
|---|---|---|---|
| 6,856,759 B1 * | 2/2005 | Fukuda et al. | 386/96 |
| 7,340,153 B2 | 3/2008 | Isobe et al. | |
| 2002/0018644 A1 | 2/2002 | Isobe et al. | |
| 2007/0086749 A1 | 4/2007 | Isobe et al. | |
| 2007/0133948 A1 * | 6/2007 | Kikuchi et al. | 386/95 |

FOREIGN PATENT DOCUMENTS

| | | |
|---|---|---|
| JP | 07-121311 A | 5/1995 |
| JP | 11-185453 A | 7/1999 |
| JP | 11-215466 A | 8/1999 |
| JP | 11-232792 A | 8/1999 |
| JP | 11-259957 A | 9/1999 |
| JP | 11-288580 A | 10/1999 |
| JP | 11-328929 | 11/1999 |
| JP | 2000-082276 A | 3/2000 |
| JP | 2000-090651 A | 3/2000 |
| JP | 2000-307987 A | 11/2000 |
| JP | 2001-043617 A | 2/2001 |
| JP | 2001-054041 A | 2/2001 |
| JP | 2001-054065 A | 2/2001 |
| JP | 2001-084706 A | 3/2001 |
| JP | 2001-266496 A | 9/2001 |
| JP | 2001-266544 A | 9/2001 |
| JP | 2001-352521 A | 12/2001 |
| JP | 2002-027381 A | 1/2002 |
| JP | 2002-152636 A | 5/2002 |
| WO | WO01/01416 A | 1/2001 |

* cited by examiner

VIDEO CAMERA AND VIDEO CAMERA INFORMATION RECORDING METHOD FOR MANAGING A SCENE AS A CHAPTER

BACKGROUND OF THE INVENTION

1. Field of the Invention

The present invention relates to a technology for recording or reproducing information from a recording medium.

2. Description of Related Art

Conventionally, there is known a technology for recording and processing information by using magnetic tape such as a VCR (Video Cassette Recorder).

There is also known a technology for recording information on disk-shaped information recording media such as a CD-RW (Compact Disc—ReWritable) and a DVD-RAM (Digital Versatile Disc—Random Access Memory) instead of on the magnetic tape.

The VCR records information sequentially on magnetic tape. Since intended information also needs to be reproduced sequentially, an information access speed is slow. By contrast, when information is recorded on disk-shaped information recording media such as CD-RW and DVD-RAM, they can provide a so-called random access to reproduce intended information immediately. The CD-RW and the DVD-RAM are characterized by a faster information access speed than the VCR.

In recent years, products on the market include a DVD recorder that digitally records videos captured through TV broadcasting and line input on a write-once DVD. The DVD recorder manages a video recorded on a recording medium based on a management unit called a video title set from the beginning to the end of a single recording operation.

FIG. 1 shows a data structure of a recording medium 101. According to this data structure, video title sets increase for the number of recorded videos such as video title set #1 (102), video title set #2 (103), . . . , and video title set #N (104). At this time, video title set #1 (102), video title set #2 (103), . . ., and video title set #N (104) correspond to title #1 (105), title #2 (106), . . . , and title #N (107) one to one, respectively. Further, each title is subdivided into units like chapter #1 (108), chapter #2 (109), . . . , and chapter #M (110) for management. For example, a chapter is increased each time the recording time exceeds five minutes, FIG. 2 shows a more detailed data structure. The data structure in FIG. 2 is configured on the recording medium 301 according to a finalization process. Information recorded on the recording medium 301 is managed by one video manager 302 and video title set #1 (303), video title set #2 (304), . . . , and video title set #L (305).

The video manager 302 comprises video manager information 306, a video manager menu video object set 307, and a video manager information backup 308. The video manager information 306 is used to manage the entire information recorded on the recording medium 301. The video manager menu video object set 307 is used to display a menu screen for reproducing information recorded on a recording medium 301. The video manager information backup 308 is backup information for the video manager information 306.

Each video title set comprises video title set information 309, a video title set menu video object set 310, a video title set video object set 311, and a video title set information backup 312. The video title set information 309 manages the entire of one video title set. The video title set information 309 is used to manage information in units of titles or chapters as shown in FIG. 1. The video title set menu video object set 310 provides information for reproducing a menu screen used to reproduce information within one video title set. The video title set video object set 311 is an AV stream of the recorded video, i.e., the information itself. The video title set information backup 312 is backup information of video object set information.

The video manager menu video object set 307 and the video title set menu video object set 310 may or may not be configured on the recording medium.

The above-mentioned recording system must create and record information about a video title set each time the recording terminates. Accordingly, a process to terminate the recording becomes time-consuming. Further, there is a limitation on the number of video title sets and titles (up to 99) that can be created on the recording medium. This also limits the number of times of recording operations. As a result, there may be a case where just a half of the recordable capacity is consumed on the recording medium even if the number of operations allowed for recording is reached. Consequently, there is a possibility of ineffectively using recording areas on the recording medium.

SUMMARY OF THE INVENTION

It is an object of the present invention to provide an information recording technology capable of shortening the termination process time when the recording ends. Another object of the present invention is to provide an information recording technology capable of recording independently of limitations due to the maximum number of video title sets and titles.

The present invention can save time for creating a video title set at the end of recording, thus shortening the recording termination time. Further, the present invention can increase the number of times for recording information signals, making it possible to effectively use recording areas on a recording medium.

In order to solve the above-mentioned problems, the present invention uses the following technology in one preferred aspect.

Information is recorded on a recording medium according to recording instructions such as a recording start instruction and a recording stop instruction. During a finalization process, management information is generated and is recorded on the recording medium. Based on this management information, the information generated by a single recording instruction is managed as one chapter. At least one chapter is managed as one title. All of the information comprising at least one title on the recording medium is managed as one video title set.

Other and further objects, features and advantages of the invention will appear more fully from the following description.

BRIEF DESCRIPTION OF THE DRAWINGS

FIG. 6 is a flowchart showing operations of the information recording/reproducing apparatus after it is turned on.

DETAILED DESCRIPTION OF THE PREFERRED EMBODIMENT

An embodiment of the present invention will be described in further detail with reference to the accompanying drawings.

Figure 3:
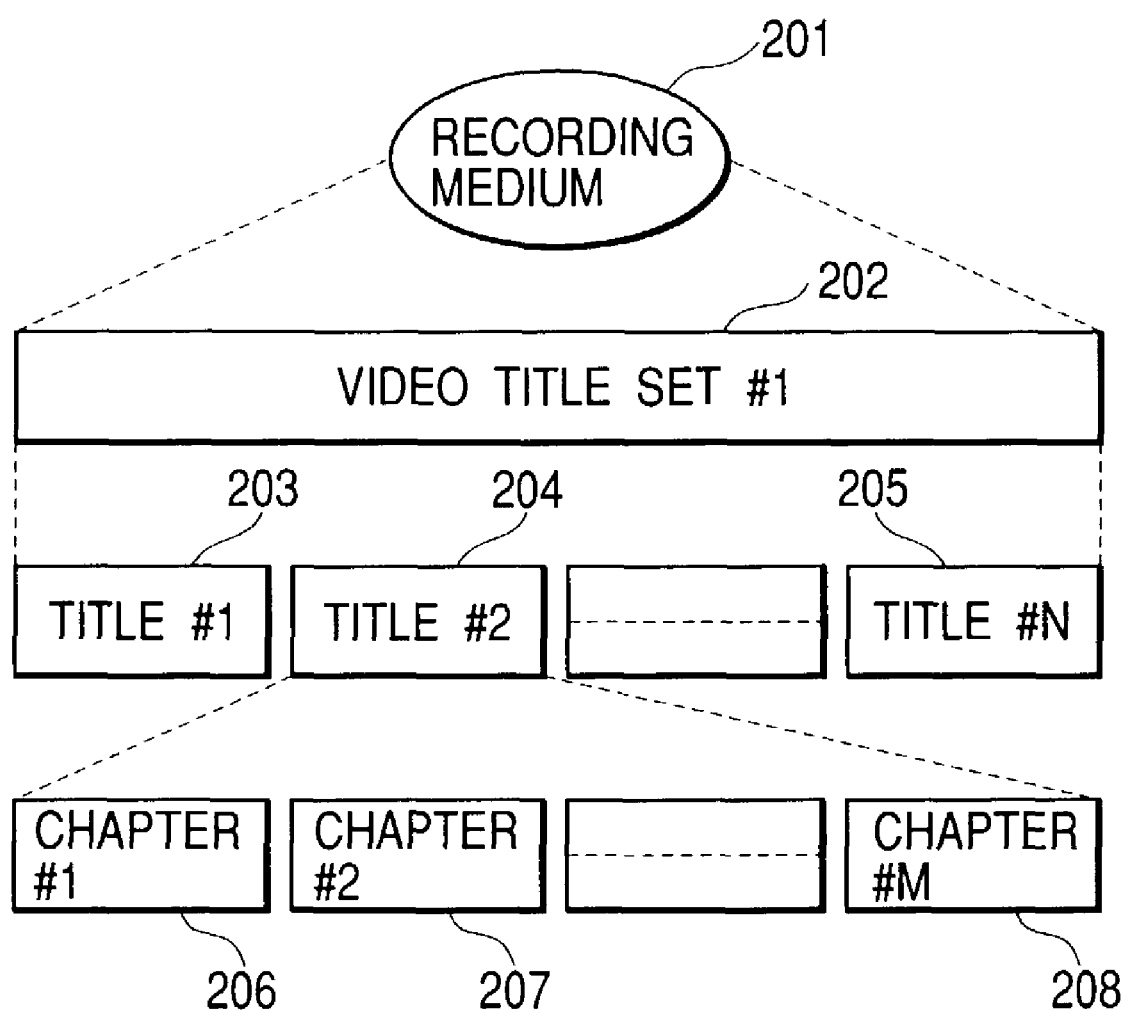
FIG. 3 shows an example of a data structure comprising a video title set, titles, and chapters.

FIG. 3 shows a data structure on a recording medium where information signals are recorded according to the embodiment of the present invention. Information is recorded so that it can be managed as one chapter from the start to the end of one recording operation. The data structure is configured to manage all the information recorded on a recording medium 201 as one video title set #1 (202). The video title set #1 (202) is subdivided into title #1 (203), title #2 (204), . . . , and title #N (205). One title is configured to bundle a plurality of chapters like chapter #1 (206), chapter #2 (207), . . . , and chapter #M (208). Various rules are available for bundling titles. For example, one title may comprise a plurality of chapters recorded on the same day. Alternatively, one title may comprise the specified number of chapters (e.g. 99 chapters).

Recording information in this manner can save time for creating a video title set at the end of recording, thus shortening the recording termination time for the time saved. Further, it becomes possible to record information more often than the limitation of the number of video title sets or titles (up to 99).

Conventionally, as mentioned above, a single recording operation from the beginning to the end (called a scene) is managed as one video title set. In addition, one video title set corresponds to one title for management. Scenes that can be recorded are restricted to the number of video title sets and titles (e.g. 99) per recording medium. According to the embodiment, however, one scene corresponds to one chapter. A title comprises a plurality of chapters. Moreover, a plurality of recorded titles is managed as one video title set as a whole. Even if there is a limitation on the number of titles as mentioned above, the number of recordable scenes per recording medium will be equivalent to the limitation on the number of titles (99) multiplied by the limitation on the number of chapters (e.g. 99). Scenes can be recorded for the number of times exceeding the number of titles.

Figure 4:
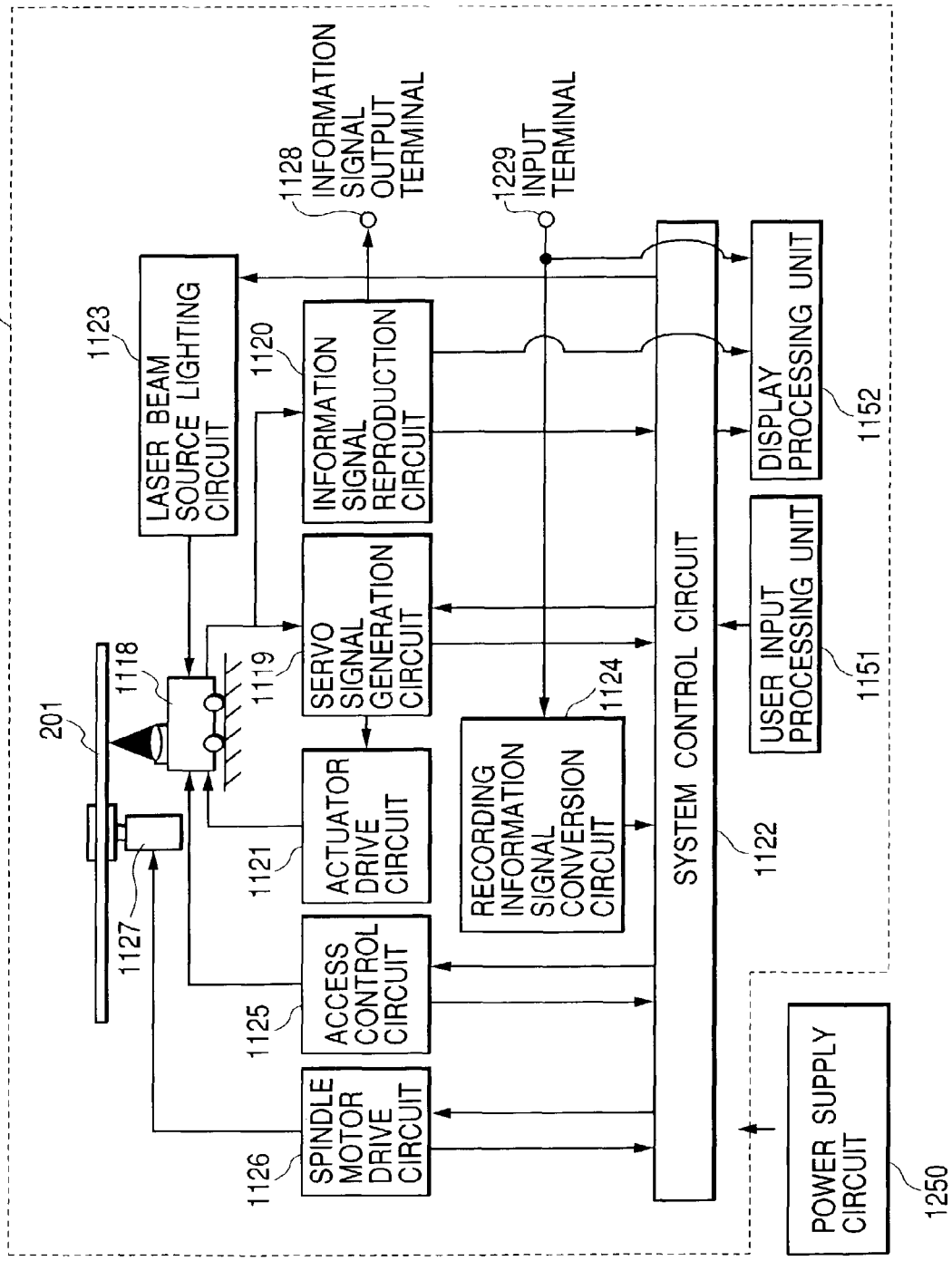
FIG. 4 is a block diagram showing an outline of an information recording/reproducing apparatus.

FIG. 4 shows a schematic block diagram of an information recording/reproducing apparatus 1200 according to the present invention. The information recording/reproducing apparatus 1200 is equivalent to a stationary apparatus as typified by a DVD recorder capable of recording TV programs and the like. The information recording/reproducing apparatus 1200 records information supplied from an input terminal 1229 on the recording medium 201. The information recording/reproducing apparatus 1200 reproduces information recorded on the recording medium 201 to output it from an information signal output terminal 1128.

A signal detected by an optical pickup 1118 is sent to a servo signal generation circuit 1119 and an information signal reproduction circuit 1120. The servo signal generation circuit 1119 generates a focusing control signal and a tracking control signal appropriate to an optical disk 201 from these detected signals. Based on these signals, an actuator drive circuit 1121 drives an objective lens actuator in the optical pickup 1118 to control objective lens positions. The information signal reproduction circuit 1120 reproduces information recorded on the optical disk 201 from the detected signal. The reproduced information is output to the information signal output terminal 1128. Part of signals obtained from the servo signal generation circuit 1119 and the information signal reproduction circuit 1120 is sent to a system control circuit 1122.

A recording information signal conversion circuit 1124 converts information supplied from the input terminal 1229 to an AV stream. The AV stream is sent to the system control circuit 1122 and is converted to a laser drive recording signal. The laser drive recording signal drives a laser beam source lighting circuit 1123 to control the laser intensity and records information on an optical disk 201 via the optical pickup 1118.

The system control circuit 1122 connects with an access control circuit 1125 and a spindle motor drive circuit 1126 which respectively control access direction positions of the optical pickup 1118 and rotations of a spindle motor 1127 of the optical disk 201. The information recording/reproducing apparatus 1200 is supplied with power from a power supply circuit 1250 that processes power supplied from a commercial power source.

A user input processing unit 1151 can be used to issue instructions for recording and reproduction. A display processing unit 1152 can display information reproduced from the recording medium 201 or supplied from the input terminal 1229.

There may be a case where the information recording/reproducing apparatus 1200 is a portable apparatus as typified by a DVD camera. In such case, after an image is picked up optically, a camera signal processing circuit (not shown) converts an information signal to an electrical signal. The converted signal is supplied to the recording information signal conversion circuit 1124. Power is supplied from a battery instead of the power supply circuit 1250.

The information recording/reproducing apparatus 1200 itself can reproduce information recorded on the recording medium even if a so-called finalization process is not performed.

Figure 5:
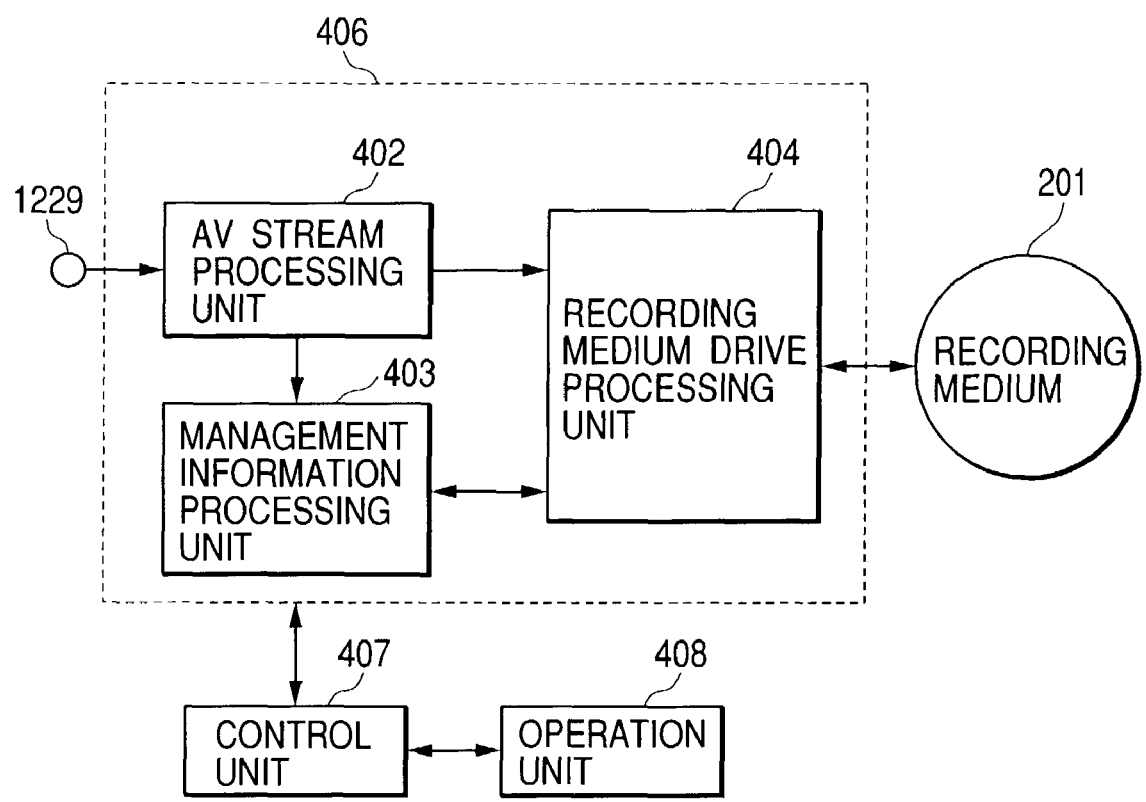
FIG. 5 is a block diagram showing part of the information recording/reproducing apparatus in detail.

FIG. 5 is a block diagram showing part of the information recording/reproducing apparatus 1200 in detail.

In FIG. 5, an AV stream processing unit 402 corresponds to the recording information signal conversion circuit 1124. A management information processing unit 403 and a control unit 407 constitute part of the system control circuit 1122 in FIG. 4. A recording medium drive processing unit 404 corresponds to the optical pickup 1118, the laser beam source lighting circuit 1123, the servo signal generation circuit 1119, the information signal reproduction circuit 1120, the access control circuit 1125, the spindle motor drive circuit 1126, the system control circuit 1122, etc. in FIG. 4. An operation unit 408 corresponds to the user input processing unit 1151.

The AV stream processing unit 402 encodes information output from the input terminal 1229. The recording medium drive processing unit 404 writes the coded information as an AV stream to the recording medium 201. On a movie apparatus or a stationary video recorder, an AV stream is written to the recording medium 201 during the beginning to the end of recording. This AV stream is written once. A segment from the beginning to the end of a single recording session is defined as one chapter.

During recording, the AV stream processing unit 402 transmits information to the management information processing unit 403. At the end of recording, the management information processing unit 403 creates intermediate management information. The recording medium drive processing unit 404 writes the intermediate management information to the recording medium 201.

This intermediate management information is written once each time the recording terminates. The operation unit 408 sends information about the beginning or end of recording to the control unit 407. The control unit 407 centrally controls each block in a portion 406 enclosed in a dotted line in FIG. 5.

Figure 6:
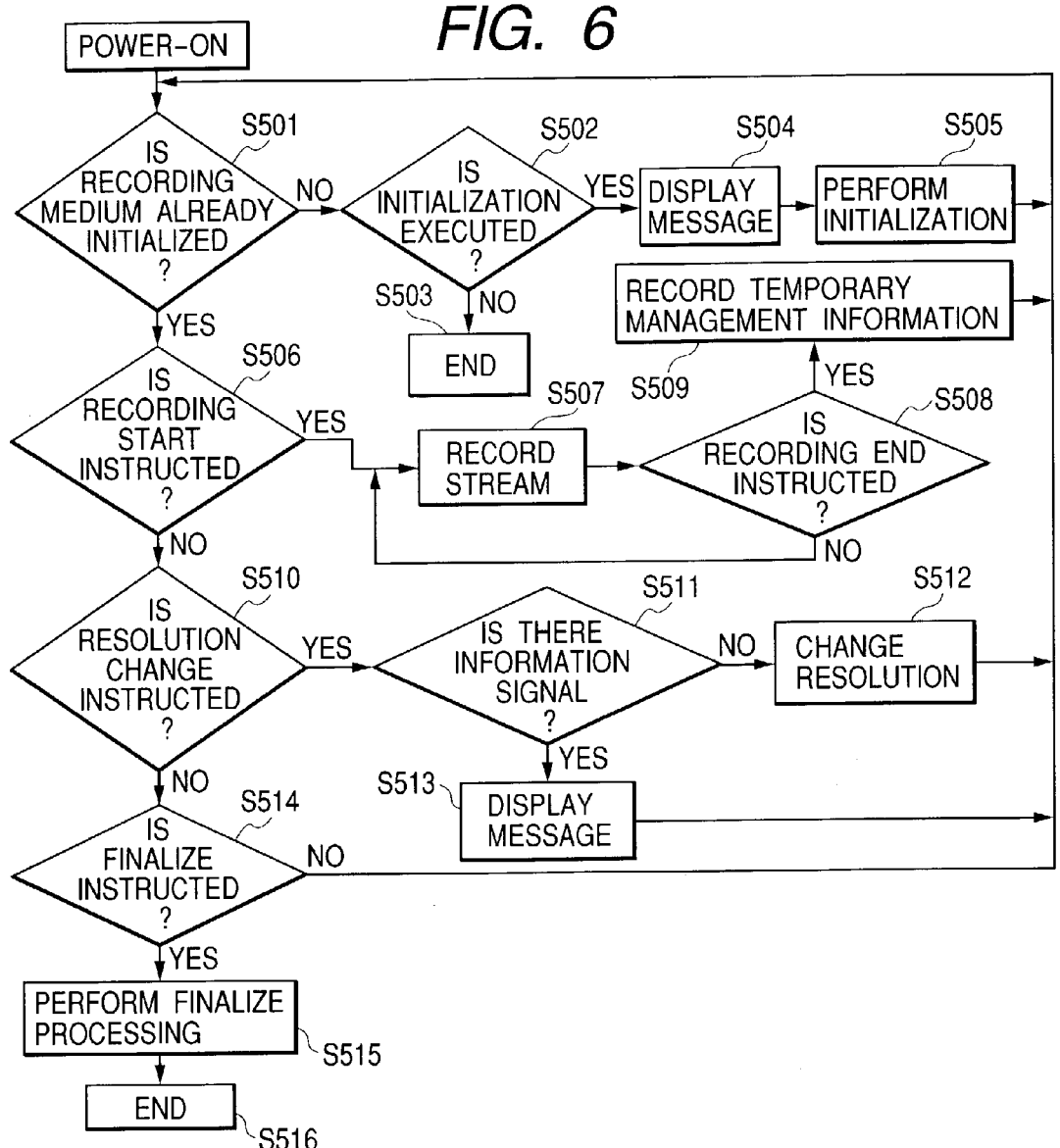

FIG. 6 is a flowchart showing operations of the information recording/reproducing apparatus 1200 after it is turned on. The following description assumes that the operations according to the flowchart are performed under control of the system control circuit 1122 (especially the control unit 407).

After the power is turned on, it is determined whether or not the recording medium drive processing unit 404 initializes the recording medium 201 (step S501). If the recording medium 201 is not initialized, the display processing unit 1152 displays a prompt to determine whether to perform the initialization (step S502). If the user input processing unit 1151 chooses not to perform the initialization, no information signal can be recorded on the recording medium 201. All the subsequent processes terminate (step S503). If the user input processing unit 1151 chooses to perform the initialization, the display processing unit 1152 displays a message indicating that no information can be recorded on the other apparatuses after the initialization (step S504). After the recording medium 201 is initialized (step S505), control returns to step S501.

If it is determined at step S501 that the recording medium is initialized, control proceeds to step S506. It is determined whether or not the user input processing unit 1151 issues a recording start instruction. If the recording start instruction is issued, the recording medium drive processing unit 404 records an AV stream (information) encoded in the AV stream processing unit 402 on the recording medium 201 (step S507) until the user input processing unit 1151 issues a recording stop instruction. When the recording stop (end) instruction is issued (step S508), the recording medium drive processing unit 404 stops recording information. The management information processing unit 403 generates intermediate management information for managing recorded AV streams. The recording medium drive processing unit 404 records this intermediate management information on the recording medium 201 (step S509), then returns control to step S501. The recording is performed so that information recorded from a recording start instruction to a recording stop instruction can be managed as one chapter.

Figure 7:
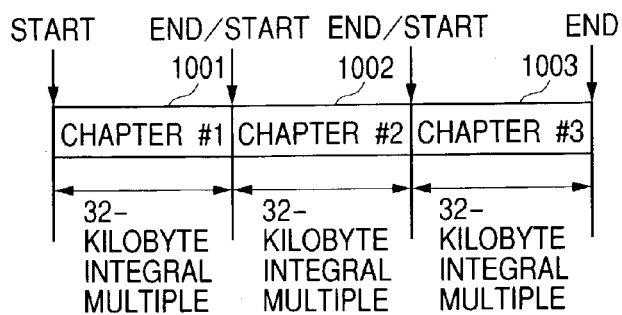
FIG. 7 shows the chapter arrangement in a video title set.

FIG. 7 shows the chapter arrangement on the recording medium 201. In this example, recording start/stop instructions are issued to record the information three times to record three chapters. The information is recorded so that no gap occurs between chapter #1 (1001) and chapter #2 (1002). Likewise, information is recorded so that no gap occurs between chapter #2 (1002) and chapter #3 (1003). In order to leave no gap between chapters, they need to be recorded in alignment with each other so that the size of each chapter becomes an integral multiple of a specified unit for recording on the recording medium. On an optical disk, for example, dummy information is recorded so that the chapters can be aligned in units of ECC blocks (32 kilobytes). The size of each chapter is adjusted to an integral multiple of the specified recording unit to generate no gap between the chapters. When the information is recorded so as to leave no gap between chapters, it can be normally reproduced also on a read-only apparatus.

If it is determined that the recording start instruction is issued at step S506, control proceeds to step S510. It is determined whether or not the user input processing unit 1151 issues a source picture resolution change instruction. If the source picture resolution change instruction is issued, the recording medium drive processing unit 404 determines whether or not the recording medium 201 already records information (step S511). If no information is recorded, the system control circuit 1122 changes the resolution to a source picture resolution specified from the user input processing unit 1151 (step S512), and then returns control to step S501. If information is recorded, the display processing unit 1152 displays a message indicating that the source picture resolution cannot be changed (step S513), and then returns control to step S501. This is because one video title set cannot manage information signals with different source picture resolutions.

If it is determined that the source picture resolution change instruction is not issued at step S510, control proceeds to step S514. It is determined whether or not the user input processing unit 1151 issues a finalization process instruction. If no finalization process instruction is issued, control returns to step S501. If the finalization process instruction is issued, a finalization process is performed by executing steps S515 through S517 (step S515). The subsequent operations are terminated (step S516).

Figure 1:
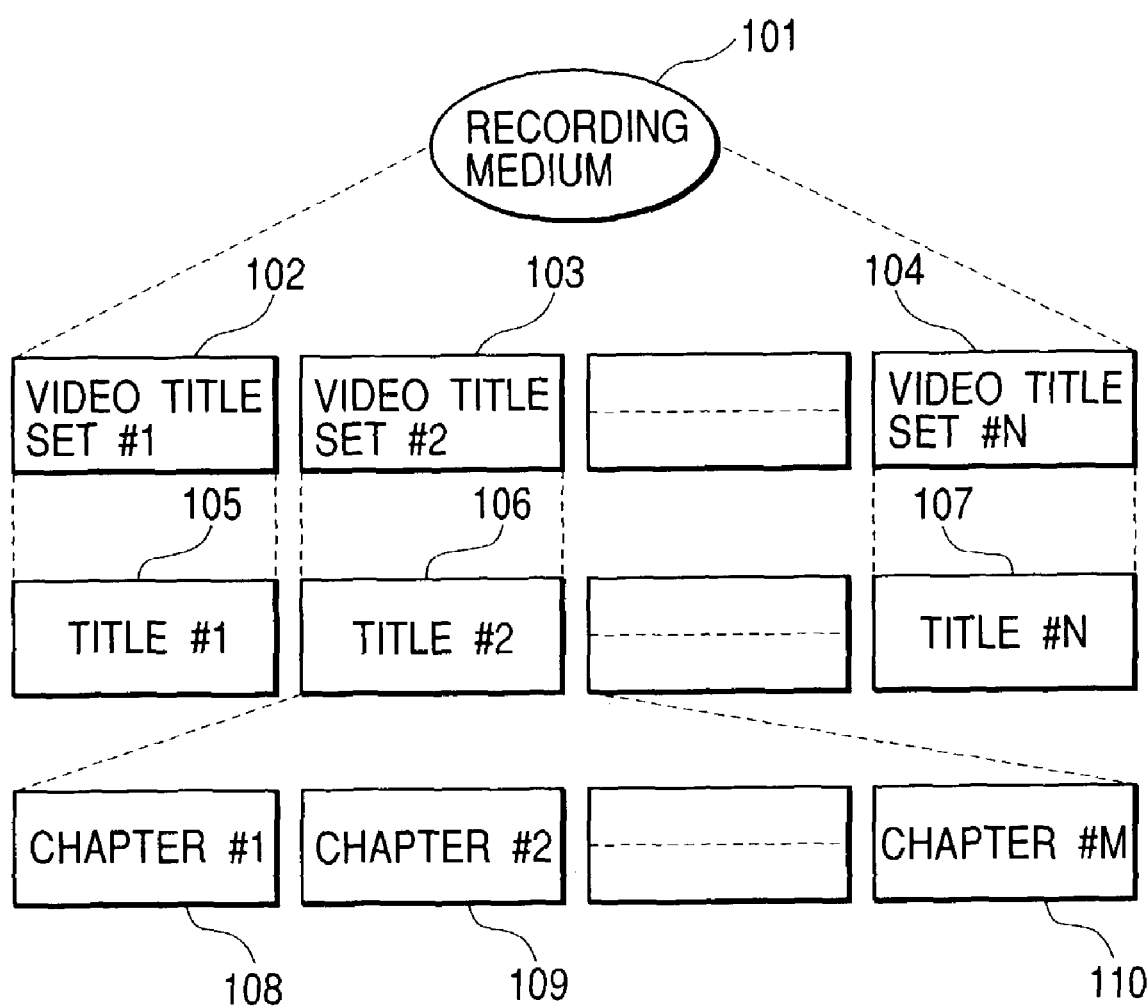
FIG. 1 shows an example of a data structure comprising video title sets, titles, and chapters.
Figure 2:
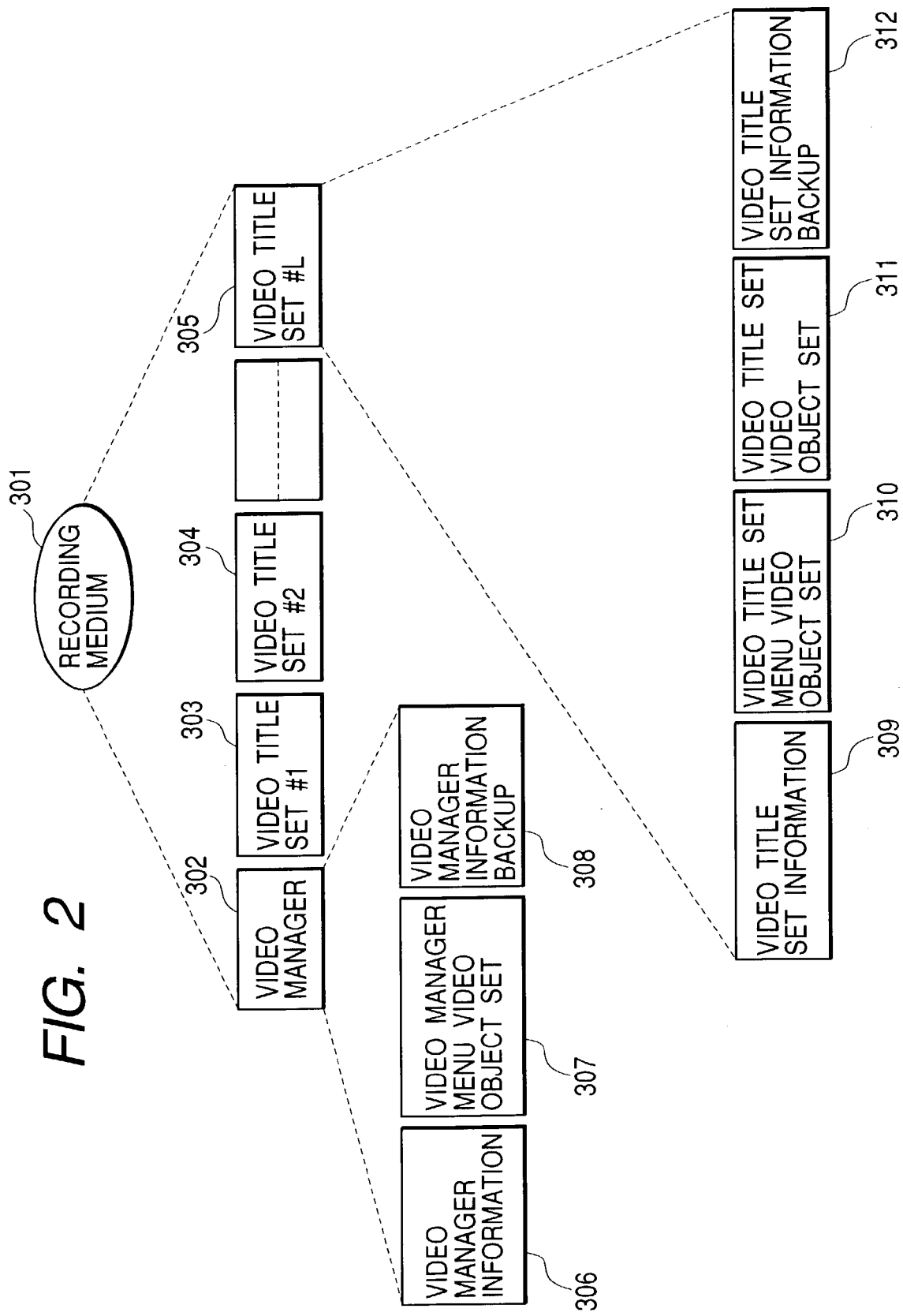
FIG. 2 shows a data structure configured on a recording medium.

Performing the finalization process at step S515 constructs the data structure as shown in FIG. 2. Specifically, the process generates management information and menu screen information for reproduction, and then records these pieces of information on the recording medium 201. As mentioned above, it is obvious that the embodiment generates only one video title set.

The management information is equivalent to the video manager information 306, the backup for video manager information 308, the video title set information 309, and the video title set information backup 312 in FIG. 2. The menu screen information for reproduction is equivalent to the video manager menu video object set 307 and the video title set menu video object set 310 in FIG. 2.

The management information is created based on the intermediate management information recorded on the recording medium at the end of recording. As shown in FIG. 3, the recorded AV stream is configured to be one video title set #1 (202). One scene from the beginning to the end of the recording is allocated to a chapter. Chapters are foldered according to the same date to form a title. When the number of chapters on the same date reaches a specified value, e.g. 99, these chapters are united to a title.

The foregoing invention has been described in terms of preferred embodiments. However, those skilled, in the art will recognize that many variations of such embodiments exist. Such variations are intended to be within the scope of the present invention and the appended claims.

What is claimed is:

1. A video camera to start recording information on a recording medium according to a recording start instruction and stop recording information on a recording medium according to a recording stop instruction, the video camera comprising:

a signal processing module which generates management information for managing the information recorded on the recording medium using management units of chapters, titles where each title includes plural chapters, and video title sets where each video title set includes plural titles, wherein the number of the recordable video title sets on the recording medium are limited; and a recording module which records the information and the management information on the recording medium;

wherein;

when the information is recorded on the recording medium in accordance with a maximum limitation on the number of the video title sets and the titles that can be managed on the recording medium, the video camera makes the information of one scene recorded on the recording medium correspond to the chapter and makes the number of the recordable scenes on the recording medium be more than the maximum number of the video title sets and the titles, wherein the information of one scene corresponding to the chapter comprises information recorded from a single recording start instruction to a single recording stop instruction, the recorded chapters are not allocated to any video title set until a finalization process is performed in response to a single finalization instruction from a user, and the number of chapters in each of the video title sets is determined and based on a number of information recorded on the recording medium from a single recording start to a single recording stop during said finalization process, such that the number of chapters is greater than or equal to a maximum number of the video title sets which are able to be recorded on the recording medium, and the chapter is subdivided from the title, wherein the information of one scene is made to correspond to the chapter when the information of one scene is recorded on the recording medium.

2. The video camera according to claim 1, wherein when the amount of the information upon reception of a recording stop instruction is smaller than an integral multiple of a specified recording unit for the recording medium, the information is recorded in alignment to adjust the amount of the information to an integral multiple of the specified recording unit for the recording medium.

3. The video camera according to claim 1, wherein a plurality of chapters of information recorded on the same date is managed as one title.

4. An information recording method of a video camera to start recording information on a recording medium according to a recording start instruction and stop recording information on a recording medium according to a recording stop instruction, the method comprising:

a first step of generating management information which manages the information recorded on the recording medium using management units of chapters, titles where each title includes plural chapters, and video title sets where each video title set includes plural titles, wherein the number of the recordable video title sets on the recording medium are limited; and a second step of recording the information and the management information on the recording medium;

wherein in the second step, when the information is recorded on the recording medium in accordance with a maximum limitation on the number of the video title sets and the titles that can be managed on the recording medium, the video camera makes the information of one scene recorded on the recording medium correspond to the chapter and makes the number of the recordable scenes on the recording medium be more than the maximum number of the video title sets and the titles, wherein the information of one scene corresponding to the chapter comprises information recorded from a single recording start instruction to a single recording stop instruction, the recorded chapters are not allocated to any video title set until a finalization process is performed in response to a single finalization instruction from a user, and the number of chapters in each of the video title sets is determined and, based on a number of information recorded on the recording medium from a single recording start to a single recording stop during said finalization process, such that the number of chapters is greater than or equal to a maximum number of the video title sets which are able to be recorded on the recording medium, and the chapter is subdivided from the title, wherein the information of one scene is made to correspond to the chapter when the information of one scene is recorded on the recording medium.

5. The information recording method of a video camera according to claim 4, wherein in the second step, when the amount of the information upon reception of a recording stop instruction is smaller than an integral multiple of a specified recording unit for the recording medium, the information is recorded in alignment to adjust the amount of information to an integral multiple of the specified recording unit for the recording medium.

6. The information recording method of a video camera according to claim 4, wherein in the first step, a plurality of chapters of information recorded on the same date is managed as one title.

7. The information recording method of a video camera according to claim 4, wherein:

the recording medium is an optical disk, and in the first step, the management information is generated such that an amount of information recorded on the optical disk from one recording start to one recording stop is greater than a maximum size of the video title set recorded on the optical disk.

\* \* \* \* \*